No. 857,476. PATENTED JUNE 18, 1907.
G. D. MUNSING.
SPEED CHANGING MECHANISM.
APPLICATION FILED APR. 4, 1907.

2 SHEETS—SHEET 1.

Witnesses
Edwin L. Yewell
Jesse N. Lutton.

Inventor
George D. Munsing
By Henry Orth Jr.
Attorney

No. 857,476. PATENTED JUNE 18, 1907.
G. D. MUNSING.
SPEED CHANGING MECHANISM.
APPLICATION FILED APR. 4, 1907.

2 SHEETS—SHEET 2.

Witnesses
Edwin L. Yewell
Jesse N. Lutton

Inventor
George D. Munsing
By Henry Orth
Attorney

UNITED STATES PATENT OFFICE.

GEORGE D. MUNSING, OF NEW YORK, N. Y.

SPEED-CHANGING MECHANISM.

No. 857,476.  Specification of Letters Patent.  Patented June 18, 1907.

Application filed April 4, 1907. Serial No. 366,339.

*To all whom it may concern:*

Be it known that I, GEORGE D. MUNSING, a citizen of the United States, residing at New York, in the county and State of New York, United States of America, have invented certain new and useful Improvements in Speed-Changing Mechanism; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to transmission mechanism and more particularly to that class of mechanism included between the prime mover and the driven part to alter the speed ratio of the latter and especially applicable to that class of mechanisms designed for motor vehicles.

Figure 1:
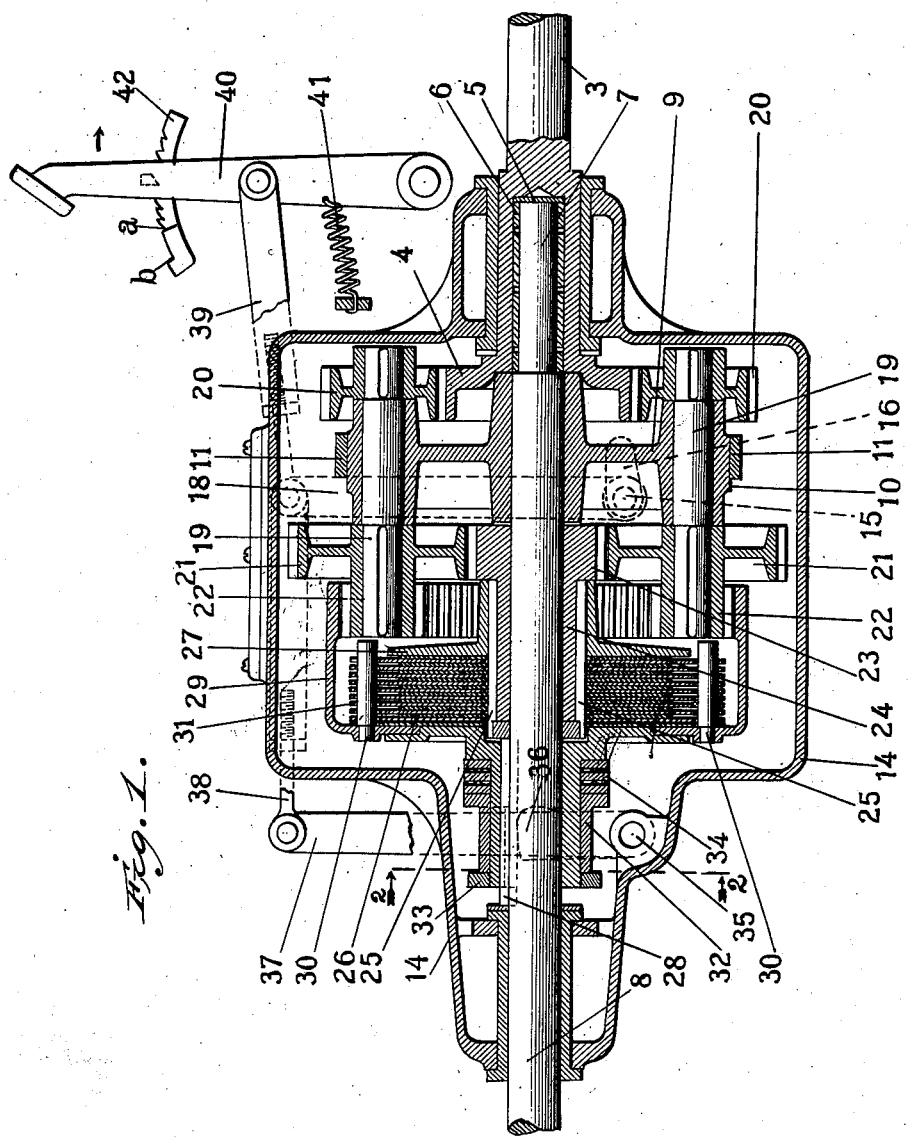
Figure 2:
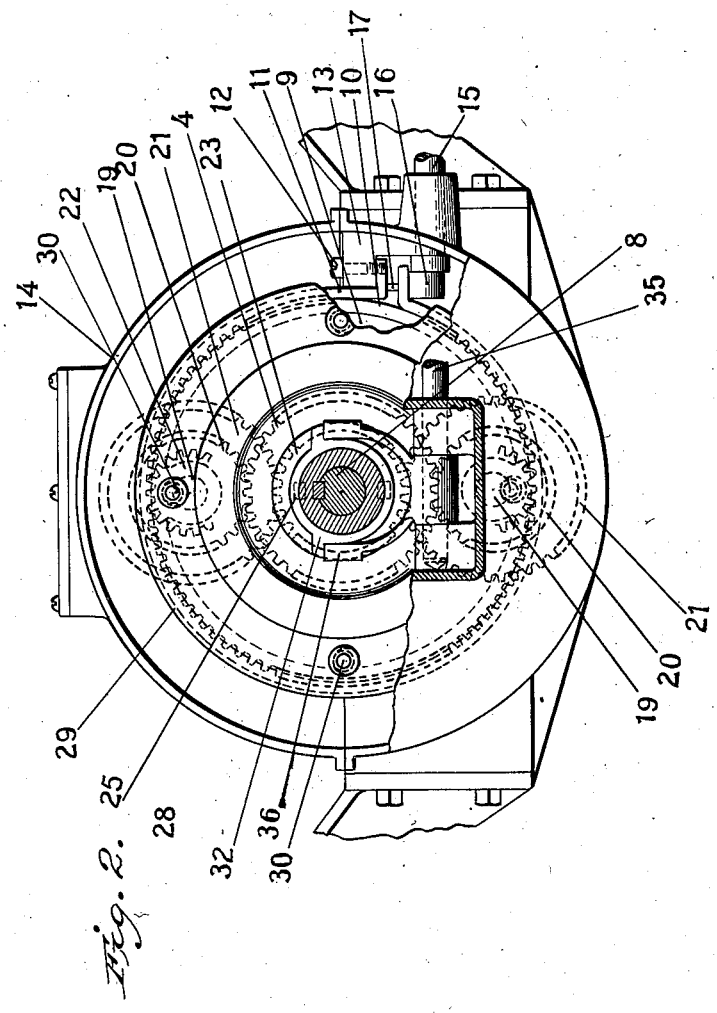

Referring to the drawings in which like parts are similarly designated, Figure 1, is a longitudinal section. Fig. 2, is a section substantially on line 2—2 of Fig. 1.

The shaft 3 is either a continuation of the engine shaft or is directly connected to the engine shaft and carries a gear wheel 4 on its end. Through the gear wheel 4 in the center of one end of shaft 3 is a recess for the reception of a thrust bearing plate 5, a bushing 6 and a reduced end 7 of the driven shaft 8. Loose on the end of the driven shaft and having end bearing against the gear wheel 4 is a loose member or brake wheel 9 provided on its outer periphery with a braking face 10 engaged by a brake strap 11. This brake strap is held at one end, Fig. 2, by a screw 12 in the bracket 13 formed on the casing 14. Passing through the casing and bracket is a shaft 15 having an arm 16 on which rests the free end of the brake strap 11, said free end having fixed thereto a guide pin 17 which is slidable in a hole in the fixed end of the strap, thereby preventing lateral movement of the free end during the movement of the arm 16 and preventing the free end from slipping out of its position, said arm and its shaft 15 being moved by a lever 18.

The brake wheel or spider 9 has journaled in it shafts 19 symmetrically distributed around the center of the spider and I have here shown two such shafts. On one side of the spider and keyed or otherwise secured on the ends of the shafts 19 are driven pinions 20 that gear with and are driven by the gear wheel 4 on the driving shaft and on the opposite ends of shafts 19 are keyed planet gear wheels 21 and planet pinions 22. The gear wheels 21 and pinions 22 are herein shown made in one piece but it is obvious that they may be made separately and keyed or otherwise secured on the ends of shafts 19.

The planet gear wheels 21 mesh with the gear wheel 23, which has an elongated boss or sleeve 24. This gear wheel and sleeve are free to rotate on the driven shaft 8. The sleeve 24 is provided with suitable feathers 25 and on the elongated boss 24 are suitably mounted friction plates 26 held against rotation thereon by feathers 25 and limited in their sliding movement on the boss toward the gear wheel 23 by a stop plate 27 fixed to the boss or gear wheel as desired.

Slidably mounted on the driven shaft 8 by means of the feather 28 is an internal gear 29 whose toothed rim is engaged by the planet pinions 22 and between the toothed rim and the web of this gear are included the friction plates, said web having pins 30 fixed therein, preferably four in number. On these pins are mounted complementary friction plates 31 which alternate with the friction plates 26 already described.

Mounted loose on the boss of the internal gear wheel 29 is a flanged sleeve 32 held in place on said boss by lock ring 33 and between the end of said sleeve and the internal gear is a ball bearing 34 designed to take the end thrust of said sleeve. Pivoted in the case 14 on a shaft 35 is a fork 36 taking against the flange of sleeve 32, said fork and its shaft 35 being operated by a lever 37, the levers 37 and 18 being connected by an adjustable rod 38 pivoted to their ends and the lever 18 is connected by an adjustable rod 39 to the foot lever 40 or other form of operating lever, retracted by a spring 41 and operating over a rack 42, said foot lever and rack being of any desired or convenient construction.

The operation is as follows: When the lever 40 is at the point *a* of the rack 42 the engine runs idle, the friction plates 26 and 31 being disengaged and the brake band 11 being loose, permits the gear wheel 4 on the driven shaft 3 to rotate pinions 20, shaft 19 and the spider, freely around the driven shaft without performing any work. As the foot lever 40 is advanced, the advancement in this direction of lever 18 does not affect the brake band, but the advancement of lever 37 rotates shaft 35, fork 36 and forces the internal gear 29 along the driven shaft compressing the disks and causing friction between them thus tending to lock the internal gear 29 and gear wheel 23 together to retard the rotation of the gear wheel 23. The member 23 being no longer freely revoluble on the driven shaft 8 will act on planet gear wheels 21 to retard the rotation of the spider 9 and the planet pinions 22 will drive the internal gear 29 at a speed depending upon the relative opposite rotation of the alternate friction disks. By moving the foot lever 40 to its limit to positively lock internal gear 29 and gear wheel 23 by the friction plate between them, the whole mechanism will move as a unit so that the driven shaft will revolve at the same speed as the driving shaft. By moving the foot lever in the direction opposite to that of the arrow between the points a and b of the rack, the internal gear is moved to release the friction plates and allow the parts 29, 23, 25 to move independently of one another, the brake band 11 being then applied to tend to hold the brake wheel 9 stationary, this will cause a reversal of movement, the speed of reverse movement depending on the slip between the brake wheel and the brake band. In all cases the driving shaft and engine are operating at full speed. The casing 14 is tight and is adapted to be filled with oil.

I claim:—

1. In a mechanism such as described, the combination with a driving shaft, a gear wheel thereon, a brake wheel, planet pinions carried by the brake wheel and meshing with said gear wheel, a driven shaft, a gear wheel loose thereon, an internal gear slidable on the driven shaft, planet wheels driven by the aforesaid planet pinions driving the gear wheel loose on the driven shaft, planet pinions adjacent the aforesaid planet gear wheels gearing with the internal gear wheel and means between the internal gear wheel and the gear wheel on the driven shaft to frictionally control their relative rotation.

2. In mechanism such as described, the combination with a driving shaft and toothed element thereon; of a driven shaft, an internal gear wheel slidable on the driven shaft and a member loose on the driven shaft, planet gearing carried by said member thereby gearing the toothed element to the internal gear wheel and means including friction mechanism operated by the sliding movement of the internal gear wheel to frictionally retard the planet gearing and control the revolution of the internal gear wheel and driven shaft in accordance with the degree of friction.

3. In mechanism such as described, the combination with alined driving and driven shafts, an externally toothed member on one shaft and an internally toothed axially slidable member on the other shaft, an intermediate member between them free to rotate, planet gear wheels mounted on said intermediate member and gearing with both the externally and internally toothed members, and means including friction mechanism operated by the axial movement of the internally toothed member to cause said planet gear wheels to impart differential rotation between the externally and internally toothed members depending upon the slip in the friction mechanism.

4. In mechanism such as described, the combination with driving and driven shafts, an externally toothed member on one shaft and an internally toothed axially slidable member on the other shaft, an intermediate member between them free to rotate, planet gear wheels mounted on said intermediate member and gearing with both the externally and internally toothed members; means including friction mechanism operated by the axial movement of the internally toothed member to cause said planet gear wheels to impart differential rotation between the externally and internally toothed members and means brought into operation when the friction mechanism is released to reverse the direction of rotation of the internally toothed member.

5. In mechanism such as described, the combination with alined driving and driven shafts; of an externally toothed member on one shaft and an internally toothed, axially slidable member on the other shaft, an intermediate brake member between them free to rotate, planet gear wheels mounted on the brake member and gearing with the other two members, and a brake band to control the rotation of the brake member.

6. In mechanism such as described, the combination with alined driving and driven shafts; of an externally toothed member on one of the shafts and an internally toothed axially slidable member on the other, a brake member between the aforesaid members free to rotate on one of the shafts, short shafts mounted to rotate in the brake member, planet wheels on the shafts driven by the externally toothed member and planet wheels and planet pinions on said short shafts, the pinions gearing with the internally toothed member, a loose gear wheel on one of the shafts meshing with the gear wheel on the short shafts, friction plates slidable but not rotatable on the loose gear wheel, alternate friction plates slidable in and movable with the internally toothed member, a brake band for the brake member and connected simultaneously movable levers one for axially moving the internal toothed member and the other for operating the brake band.

7. In mechanism such as described the combination with driving and driven shafts; of a toothed member on one shaft and a toothed axially slidable member on the other shaft, planet gear wheels gearing the two members together and friction mechanism operated by the axial movement of the axially slidable member.

8. In mechanism such as described, the friction mechanism comprising an internally toothed member, friction plates mounted within the member carried by the web a gear wheel whose sleeve or boss projects into the toothed member and friction plates thereon co-operating with the first-mentioned friction plates.

9. In mechanism such as described, the friction mechanism comprising an internally toothed member, pins secured to the web of said member, friction plates loosely mounted on said pins, a gear wheel whose boss or sleeve projects into the internally toothed member and through the plates mounted therein, a stop plate on said boss and friction plates axially movable on the boss and alternating with the afore-mentioned friction plates.

In testimony that I claim the foregoing as my invention, I have signed my name in presence of two subscribing witnesses.

GEORGE D. MUNSING.

Witnesses:
    Jos. D. E. Hughes,
    William H. Leslie.